United States Patent [19]

Kamiguchi et al.

[11] Patent Number: 4,812,268
[45] Date of Patent: Mar. 14, 1989

[54] SUCKBACK METHOD AND APPARATUS IN AN INJECTION MOLDING MACHINE

[75] Inventors: Masao Kamiguchi, Houya; Hiroshi Umemoto, Hino, both of Japan

[73] Assignee: Fanuc Ltd., Minamitsuru, Japan

[21] Appl. No.: 196,080

[22] PCT Filed: Jul. 24, 1987

[86] PCT No.: PCT/JP87/00542
§ 371 Date: Mar. 22, 1988
§ 102(e) Date: Mar. 22, 1988

[87] PCT Pub. No.: WO88/00519
PCT Pub. Date: Jan. 28, 1988

[30] Foreign Application Priority Data

Jul. 24, 1986 [JP] Japan .................................. 61-172824

[51] Int. Cl.⁴ .............................................. B29C 45/77
[52] U.S. Cl. ................................... 264/40.1; 264/40.5; 264/40.7; 318/632; 364/476; 425/135; 425/149; 425/166
[58] Field of Search ............... 264/40.1, 40.5, 40.7, 264/328.1; 425/135, 136, 145, 149, 150, 155, 162, 166, 169, 214; 318/567, 572, 632; 364/476

[56] References Cited

U.S. PATENT DOCUMENTS

| | | | |
|---|---|---|---|
| 4,524,313 | 6/1985 | Kuno et al. | 318/563 |
| 4,710,119 | 12/1987 | Otako | 425/150 |
| 4,718,841 | 1/1988 | Kiya | 425/171 |
| 4,734,025 | 3/1988 | Kawamura et al. | 425/171 |
| 4,755,123 | 7/1988 | Otake | 264/40.7 |
| 4,759,705 | 7/1988 | Otake et al. | 425/145 |

FOREIGN PATENT DOCUMENTS 60-242027 12/1985 Japan .
60-262616 12/1985 Japan .

Primary Examiner—Jan H. Silbaugh
Assistant Examiner—Jill L. Heitbrink
Attorney, Agent, or Firm—Staas & Halsey

[57] ABSTRACT

A suckback method and apparatus is capable of positively effecting a suckback operation in an injection molding machine using a servomotor as an injection axis drive source for axially driving a screw. When the screw reaches a metering completion position, screw rotation is stopped and a follow-up operation for an error register is carried out so that an error amount accumulated in the error register becomes equal to zero (steps S1, S4, S5). Then, a torque limit for the servomotor and for application of back pressure is released (step S8), and the screw is driven backwardly by the servomotor by a predetermined suckback amount (step 11).

7 Claims, 3 Drawing Sheets

SUCKBACK METHOD AND APPARATUS IN AN INJECTION MOLDING MACHINE

BACKGROUND OF THE INVENTION

1. Field of the Invention

The present invention relates to a suckback method capable of positively effecting a suckback operation in an injection molding machine which employs a servomotor as an injection axis drive source for axially driving the screw.

2. Description of the Related Art

In metering operation, when a screw receives the back pressure and at the same time is drivingly rotated, resin material in a heating cylinder becomes molten by virtue of thermal energy supplied from a heater and frictional heat generated during screw rotation. As an amount of the molten resin accumulated in the distal end portion of the heating cylinder increases, the screw is subjected to molten resin pressure. This pressure is in the opposite direction of the screw movement and would cause the screw to be moved backward. Thereafter, the screw rotation is stopped when the screw reaches a metering completion position. Then, the so-called suckback operation is effected by slightly moving the screw backward and at the same time eliminating the back pressure so as to disconnect the molten resin material between a sprue bushing and a nozzle to prevent the resin from loosely falling off. An injection molding machine of a type equipped with a hydraulic drive source on its injection axis can easily effect such suckback operation. On the other hand, in an injection molding machine of a different type employing a servomotor as the injection axis drive source and limiting the output torque of the servomotor to provide a controlled back pressure during the metering process, the following drawback can occur. That is, when the torque limit for the servomotor is released to generate a drive force enough to effect suckback operation, the screw is moved forwardly by virtue of the presence of an error amount accumulated in an error register of a servo circuit for driving the servomotor, and hence the suckback operation cannot be smoothly performed.

SUMMARY OF THE INVENTION

The object of the present invention is to provide a suckback method in an injection molding machine capable of effecting a smooth suckback operation by preventing forward movement of the screw upon execution of the suckback operation at the last stage of a metering process.

According to the present invention, an injection molding machine includes a servomotor as an injection axis drive source for axially driving a screw a servo circuit adapted to drive the servomotor and including an error register for storing therein an error amount indicative of the difference between a commanded screw position and an actual screw position. A torque limit for the servomotor is effected to apply a set back pressure to resin. In order to achieve the object, a suckback method in an injection molding machine, according to the present invention, comprises the steps of: (a) stopping screw rotation when the screw reaches a metering completion position; (b) reducing an error amount, accumulated in the error register at the time the screw rotation is stopped, to a value less than a predetermined value; (c) releasing torque limit for the servomotor and for applying the preset back pressure; and (d) driving the screw backwardly by means of the servomotor by a predetermined suckback amount. Preferably, a follow-up operation for the error register is carried out in step (b) so that the error amount accumulated in the error register becomes equal to zero.

As mentioned above, according to the present invention, the error amount, accumulated in the error register at the time the metering completion position is reached, is reduced to a value less than the predetermined value, preferably to zero, by carrying out a follow-up operation for the error register, before the screw is driven for suckback operation by means of the servomotor, with the torque limit for the servomotor released. Accordingly, the suckback operation can be accurately and positively carried out.

DESCRIPTION OF THE PREFERRED EMBODIMENT

Figure 1:
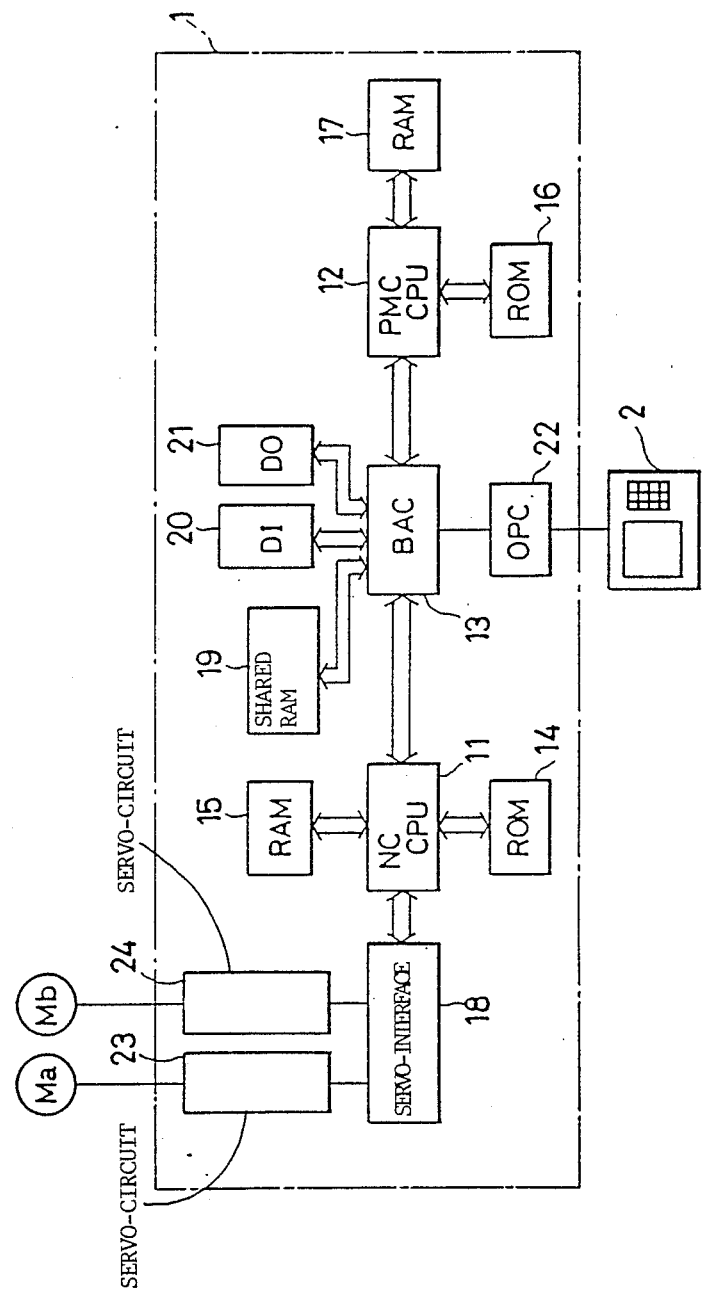
FIG. 1 is a schematic view showing an arrangement of a control section of an injection molding machine embodying a suckback method according to an embodiment of the present invention.

In FIG. 1, numeral 1 designates a numerical control unit for controlling an injection-molding machine. The unit 1 comprises a numerical control microprocessor (hereinafter referred to as NCCPU) 11, and a microprocessor (hereinafter referred to as PMCCPU) 12 for controlling a programmable machine controller, not shown. Connected to the NCCPU 11 are a ROM 14 having stored therein a monitor program for generally controlling the injection-molding machine, and a RAM 15 for temporal storage of data. Also connected to the NCCPU 11 through a servo-interface 18 are servo circuits for drivingly controlling servomotors for respective axes for clamp, ejector, injection, and screw rotation. FIG. 1 shows only servomotors Ma, Mb for the injection axis and the screw rotation axis, respectively and servo circuits 23, 24 associated with each of the respective servomotors Ma, Mb.

Connected to the PMCCPU 12 are a ROM 16 having stored therein a sequence program for use in execution of various kinds of operations of the injection-molding machine to be described later, and a RAM 17 for temporal storage of data. Numeral 19 represents a nonvolatile shared RAM having a back-up power source and adapted to store an NC program for use in control of various kinds of operations of the injection-molding machine, various kinds of set values, parameters and the like. Numeral 13 denotes a bus-arbiter controller (hereinafter referred to as BAC). Connected to the BAC 13 through respective buses are the NCCPU 11, the PMCCPU 12, the shared RAM 19, an input circuit 20, and an output circuit 21. The BAC 13 is adapted to selectively permit the use of the buses by both the CPUs 11, 12. A data input unit with display (hereinafter referred to as CRT/MDI) 2 is serially connected to the BAC 13 through an operator panel controller (OPC) 22.

Figure 3:
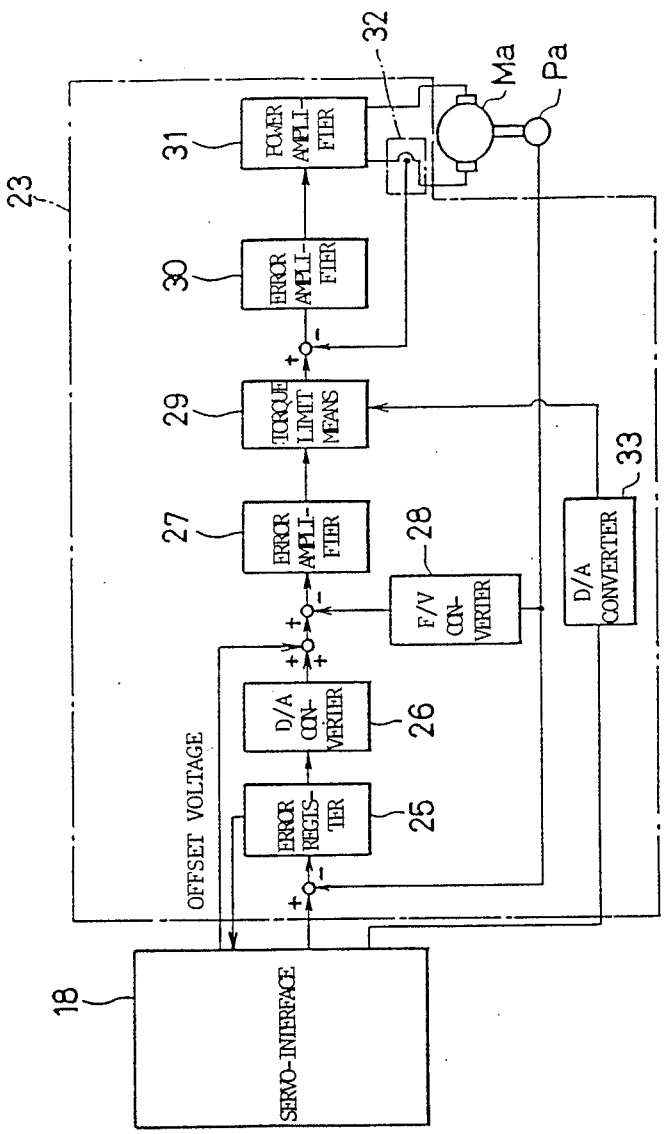
FIG. 3 is a schematic block circuit diagram showing an injection axis servo circuit of FIG. 1.

The servo circuit 23 and its peripheral elements will next be described further with reference to FIG. 3. In FIG. 3, symbol Pa denotes a pulse encoder which is coupled to the injection axis servomotor Ma to output pulses with rotation of the motor, i.e., axial movement of a screw, not shown.

The servo circuit 23 comprises an error register 25 which is operative in response to a command pulse for axially moving the screw, supplied from the NCCPU 11 through the servo-interface 18, and a pulse output from the pulse encoder Pa, to store a current deviation between a command screw position and an actual screw position. A D/A converter 26 for converting the stored value of the error register 25 into an analog speed command voltage is arranged at the subsequent stage of the error register 25. The voltage of this speed command voltage and an offset voltage (to be described later) from the servo-interface 18 are added and the sum is applied to a noninverting input terminal of an error amplifier 27. An inverting input terminal of the amplifier 27 is connected to an F/V converter 28 for converting the frequency of a pulse train outputted from the pulse encoder Pa into a voltage representative of an actual screw moving speed, such that the amplifier 27 outputs a deviation between the above-mentioned added voltage and the actual speed voltage as an armature current command associated with the servomotor Ma. Torque limit means 29 for retaining the back pressure applied to the screw to a set value is arranged to receive the output of the error amplifier 27. The torque limit means 29 is adapted to be operative in response to a command from the PMCCPU 12, which is first converted into an analog signal by a D/A converter 33, to limit the output of the amplifier 27 to a value equal to or lower than a level in accordance with a preset back pressure. The numeral 30 denotes an error amplifier for amplifying a deviation between a driving current command supplied from the error amplifier 27 through the torque limit means 29 and an actual driving current detected by a current detector 32. The output of the error amplifier 30 is input to a power amplifier 31.

The servo circuit 24 is arranged similarly to the servo circuit 23 except that the servo circuit 24 does not include an element corresponding to the torque limit means 29.

Figure 2:
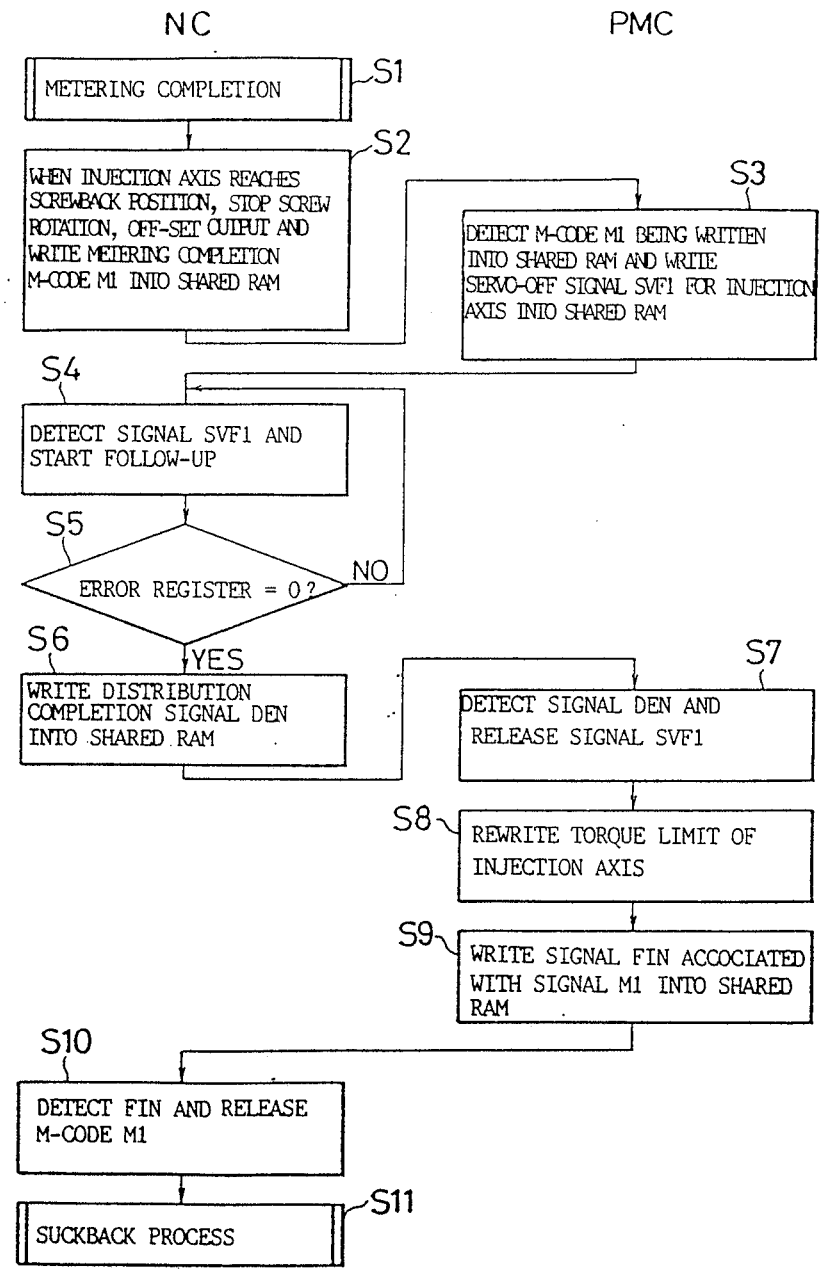
FIG. 2 is a flowchart of a metering/suckback operation program executed by the control section of FIG. 1.

In the following, with reference to FIG. 2, the operation of the injection molding machine constructed above will be explained.

At first, various preset values such as a screw back position (metering completion position), suckback amount, etc., are set by the use of the CRT/MDI 2, and then these preset values are stored in predetermined address regions of the shared RAM 19, respectively. Thereafter, a series of injection molding operations consisting of various processes are carried out in accordance with the NC program stored in the shared RAM 19.

Upon entry to the metering process (step S1), the NCCPU 11 drives the screw rotation axis servomotor Mb at a set rotatnal speed through the servo-interface 18 and the servo circuit 24, and drives the injection axis servomotor Ma through the servo-interface 18 and the servo circuit 23 in the following manner.

When the set back pressure is higher than friction force which is generated in a power transmission system (not shown) operatively connecting the screw and the servomotor Ma to each other, and which acts in the back pressure increasing direction, the NCCPU 11 does not apply the offset voltage to the error amplifier 27, but sends the torque limit command corresponding to a difference between the set back pressure and the friction force, to the torque limit means 29. Further, the NCCPU 11 outputs the move command to the error register 25 so as to retain the screw at the current position. Thereafter, as the amount of molten resin increases and the screw moves rearwardly under the resin pressure, a negative pulse is supplied from the pulse encoder Pa to the error register 25 so that the register value, i.e., the error amount representative of a difference between the command screw position and the actual screw position, increases. The torque command is outputted from the error amplifier 27, for returning the screw to its initial position in response to the increase in the register value. The torque command is limited to a value equal to or lower than the torque limit value by the torque limit means 29, to which the torque limit value is applied from the NCCPU 11, via the servo-interface 18 and the D/A converter 33. As a result, the screw, subjected to a resultant force (back pressure) of the friction force and the output from the servomotor Ma corresponding to the difference between the set back pressure and the friction force, applies the set back pressure to the resin.

During the metering process, the NCCPU 11 reads the value of the error register 25 at a predetermined cycle, and performs pulse distribution so as to bring the register value to zero. That is, the NCCPU 11 follows up the register. However, in order to follow up the register, it is necessary to do a requisite calculation on the basis of the detected register value, and then to effect pulse distribution in compliance with the calculation result. Accordingly, it takes time until the follow-up is completed. On the other hand, in the meantime, the resin pressure increases and the screw moves rearwardly. Therefore, in practice, the error register value is not brought to zero. After all, the torque command is always delivered during the metering process, for driving the screw for forward movement. In this manner, as the screw moves rearwardly to the metering completion position while applying the set back pressure to the resin, the NCCPU 11, which detects the screw current position with reference to an injection axis current value register, not shown, at each time of execution of the follow-up, detects arrival to the metering completion position, to interrupt rotation of the screw. At that time the metering operation is completed.

On the other hand, when the set back pressure is lower than the friction force, the NCCPU 11 outputs to the error amplifier 27 and offset voltage (having a negative value) acting to move the screw rearwardly, and outputs, to the torque limit means 29, a torque limit value corresponding to the difference between the friction force and the set back pressure. As a result, the torque command driving the servomotor Ma in the direction of rearward movement of the screw is applied from the error amplifier 27 to the torque limit means 29. By the means 29, the torque command is limited to a value corresponding to the difference between the friction force and the set back pressure. As the screw moves rearwardly during metering, the friction force generated in the power transmitting system acts to prevent rearward movement of the screw, while the output from the servomotor Ma acts to promote rearward movement of the screw. After all, the set back pressrue is applied to the resin. Thereafter, metering is effected in a manner like that described above.

When the metering completion position is reached, the NCCPU 11 operates to stop the rotation of the screw rotating servomotor Mb and the follow-up operation for the error register 25. If the offset voltage is being delivered, the NCCPU 11 also stops the delivery of the offset voltage. Further, the NCCPU 11 writes an M-code M1 indicative of completion of metering into the shared RAM 19 through the BAC 13 (step S2). At this time, an error amount has accumulated in the error register due to the fact that the follow-up operation has been stopped, and the above-mentioned delay has occurred in the execution of the follow-up operation. As a result, the screw is driven by the injection axis servomotor Ma in a manner urging the resin at the preset back pressure, and held at its metering completion position. In case the friction force is greater than the preset back pressure, the backward movement of the screw is prevented by the friction force being greater than the resin pressure (preset back pressure) since the delivery of the offset voltage has been terminated in the step S1, and hence the screw is held at the metering completion position.

On the other hand, upon detection of the M-code M1 being written into the shared RAM 19 through the BAC 13, the PMCCPU 12 writes a servo-off signal SVF1 for injection axis into the shared RAM 19 (step S3). When the NCCPU 11 detects that the servo-off signal SVF1 is written, it operates to cause the servomotor Ma to be energized and starts the follow-up of the error register 25 until it detects that the value of the error register 25 reaches zero (steps S4 and S5). Upon detection of the error register value becoming zero, the NCCPU 11 writes a distribution completion signal DEN into the shared RAM 19 (step S6). When the PMCCPU 12 detects that the distribution completion signal DEN is written into the shared RAM 19, it erases the servo-off signal SVF1 stored in the RAM 19 (step S7), and rewrites a torque limit value to a predetermined value greater than the preset back pressure (step S8), and further writes a signal FIN, indicative of completion of the above-mentioned process associated with the M-code M1, into the shared RAM 19 (step S9). In this manner, the torque limit value for restricting the output of the injection axis servomotor Ma to a small value associated with the back pressure is released, so as to permit the servomotor Ma to generate a greater torque. However, since the error amount stored in the error register at that time is equal to zero, the screw is kept stopped. On the other hand, upon detection of the FIN signal from the shared RAM 19, the NCCPU 11 erases the M-code M1 stored in the shared RAM 19 (step S10), and then executes the suckback process (step S11). That is, NCCPU 11 drives the servomotor Ma so as to move the screw backward by a predetermined suckback amount. On this occasion, the screw is driven by the servomotor Ma with a large driving force, and thus the suckback operation can be easily carried out. In this way, the metering process is completed.

We claim:

1. In an injection molding machine having a servomotor as an injection axis drive source for axially driving a screw and a servo circuit adapted to drive the servomotor and including an error register for storing therein an error amount indicative of the difference between a commanded screw position and an actual screw position, and where a torque limit for the servomotor is effected to apply a preset back pressure to a resin in said injection molding machine, a suckback method in said injection molding machine comprises the steps of:
    (a) stopping screw rotation when the screw reaches a metering completion position;
    (b) reducing the error amount, accumulated in the error register at the time the screw rotation is stopped, to a value less than a predetermined value by performing a pulse distribution during a follow-up operation,
    (c) releasing the torque limit for the servomotor; and then
    (d) driving the screw backwardly by means of the servomotor by a predetermined suckback amount.

2. A suckback method in an injection molding machine according to claim 1, wherein the error amount accumulated in the error register is reduced to zero in said step (b).

3. A method for ending a metering operation and starting a suckback operation in an injection molding machine having a servomotor for driving a screw comprising the steps of:
    (a) cancelling a screw rotation command of the metering operation;
    (b) performing a pulse distribution and generating an output signal representative thereof during a follow-up operation of a difference between stored commanded screw position and an actual screw position;
    (c) limiting the output signal to a torque limit value and supplying the limited signal to the servomotor so that a preset back pressure remains applied;
    (d) increasing the torque limit value; and
    (e) starting the suckback operation.

4. A method for ending a metering operation and starting a suckback operation according to claim 3, wherein the performing a pulse distribution reduces the difference to zero.

5. A servo circuit for controlling a servomotor in an injection molding machine based on commands from a processor and feedback data before initiating a suckback operation, comprising:
    error register means for storing a difference between an input screw position command signal and a fedback actual screw position signal during swtiching from a metering operation to a suckback operation;
    first error amplifier means for receiving a speed command representing the difference stored in said error register means and for outputting a current command representing a difference between the speed command and an actual speed from the servo motor;
    torque limit means for receiving the current command and for limiting the current command to a torque limit value determined by the processor;
    second error amplifier means for amplifying a difference between the limited current command and an actual present driving current; and
    power amplifier means for amplifying the amplified difference from said second error amplifier means and supplying the twice-amplified difference to the servomotor to drive the servomotor.

6. A servo circuit for controlling a servomotor in an injection molding machine according to claim 5, wherein the servomotor axially drives an injection axis of a screw.

7. A servo circuit for controlling a servomotor in an injection molding machine according to claim 6, wherein, when switching from the metering operation to the suckback operation, a screw rotation command for the metering operation is cancelled, said error register means outputs a final stored difference, the output final difference being limited by a relatively small metering torque limit value set in said torque limit means, and thereafter the processor changes the torque limit value to a relatively large suckback torque limit value, and the suckback operation is initiated.

* * * * *

UNITED STATES PATENT AND TRADEMARK OFFICE
CERTIFICATE OF CORRECTION

PATENT NO. : 4,812,268
DATED : March 14, 1989
INVENTOR(S) : Masao Kamiguchi et al.

It is certified that error appears in the above-identified patent and that said Letters Patent is hereby corrected as shown below:

Col. 1, line 54, after "screw" insert --and--;

Col. 1, line 55, delete --and--;

Col. 1, line 67, after "releasing" insert --a--;

Col. 4, line 63, "pressrue" should be --pressure--;

Col. 6, claim 3, line 18, after "between" insert --a--;

Col. 6, claim 5, line 35, "swtich-" should be --switch- --.

Signed and Sealed this

Twelfth Day of September, 1989

Attest:

DONALD J. QUIGG

Attesting Officer

Commissioner of Patents and Trademarks